(12) United States Patent
Lim

(10) Patent No.: US 8,764,608 B2
(45) Date of Patent: Jul. 1, 2014

(54) APPARATUS FOR APPLYING TORQUE FOR VIBRATION REDUCTION IN VEHICLE PARKING SYSTEM AND METHOD FOR CONTROLLING TORQUE

(75) Inventor: Sung Keun Lim, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 321 days.

(21) Appl. No.: 13/238,954

(22) Filed: Sep. 21, 2011

(65) Prior Publication Data
US 2012/0316034 A1  Dec. 13, 2012

(30) Foreign Application Priority Data
Jun. 10, 2011  (KR) .......................... 10-2011-0056478

(51) Int. Cl.
*B60T 7/12* (2006.01)
*B60T 11/10* (2006.01)

(52) U.S. Cl.
USPC .......................................................... 477/194

(58) Field of Classification Search
USPC ................. 477/182–187, 189, 194, 199, 200; 192/219.1, 219.4, 219.5
See application file for complete search history.

(56) References Cited

U.S. PATENT DOCUMENTS

| | | | | |
|---|---|---|---|---|
| 4,629,043 A * | 12/1986 | Matsuo et al. | ................ | 477/184 |
| 5,807,205 A * | 9/1998 | Odaka et al. | .................... | 477/29 |
| 5,863,277 A * | 1/1999 | Melbourne | ................... | 477/203 |
| 5,964,335 A * | 10/1999 | Taniguchi et al. | ......... | 192/219.5 |
| 7,175,555 B2 * | 2/2007 | Kozarekar et al. | ................ | 475/5 |
| 7,480,545 B2 * | 1/2009 | Braeuer et al. | .................... | 701/1 |
| 8,201,897 B2 * | 6/2012 | Bell et al. | ...................... | 303/191 |
| 8,239,107 B2 * | 8/2012 | Mair | .............................. | 701/67 |
| 2006/0049691 A1 | 3/2006 | Deprez et al. | | |
| 2008/0051252 A1 * | 2/2008 | Nishimura | ....................... | 477/92 |

FOREIGN PATENT DOCUMENTS

| | | |
|---|---|---|
| JP | 2001-295922 A | 10/2001 |
| KR | 10-2008-0000698 A | 1/2008 |
| KR | 10-0887840 B1 | 3/2009 |

* cited by examiner

*Primary Examiner* — Justin Holmes
(74) *Attorney, Agent, or Firm* — Morgan, Lewis & Bockius LLP

(57) ABSTRACT

A method for applying a torque for vibration reduction and controlling the torque in a vehicle parking system may include detecting a driver's intention to release a parking state of a vehicle being parked on a slope and applying an offset torque to the parking gear to offset the torque generated by the weight of the vehicle and the gradient of the slope. An apparatus for applying the method may include a torque converter and a gear unit for amplifying and applying the output torque from an engine in an idle state to the parking gear, and/or a drive motor which is directly connected to the parking gear, generates a torque using a power of a battery, and applies the torque to the parking gear.

9 Claims, 7 Drawing Sheets

⇐ : Apply torque

APPARATUS FOR APPLYING TORQUE FOR VIBRATION REDUCTION IN VEHICLE PARKING SYSTEM AND METHOD FOR CONTROLLING TORQUE

CROSS-REFERENCE TO RELATED APPLICATION

The present application claims priority of Korean Patent Application Number 10-2011-0056478 filed Jun. 10, 2011, the entire contents of which application is incorporated herein for all purposes by this reference.

BACKGROUND OF INVENTION

1. Field of Invention

The present invention relates to an apparatus for applying a torque for vibration reduction in a vehicle parking system and a method for controlling the torque. More particularly, it relates to an apparatus for applying a torque for vibration reduction in a vehicle parking system and a method for controlling the torque to reduce vibration and impact noise of a powertrain generated when a parking state of a vehicle on a slope is released, and reduce the operating force for releasing the parking state.

2. Description of Related Art

In general, when a shift lever is moved from the P (parking) position to the R (reverse) position or to the D (drive) position to start a vehicle parked on a slope, large vibration and impact noise are generated in the vehicle, and a high releasing force is required to move the shift lever.

In a typical parking system with a ratchet structure of a parking gear and a sprag, a force generated by the weight of the vehicle and the gradient of a slope causes a force (i.e., torque) that rotates the parking gear, which generates a large frictional resistance between the sprag and a parking cam, and thus the releasing force required to release the shift lever from the parking position is increased.

During parking, a large force is being applied to a powertrain in the rolling direction by a torque generated by the locking of the drive wheels and, at this time, if the sprag is suddenly disengaged with the parking gear (i.e., if the locking of the parking is released), the powertrain returns to its original position, thus generating vibration, impact, and impact noise.

Referring to FIG. 1, a rotating torque is applied to a parking gear 3 by a force generated by the weight of the vehicle and the gradient of the slope on a road, and this rotating torque (F1) of the parking gear 3 generates a force (F2) for raising a sprag 4. In the parking state, the sprag 4 is being in contact with a parking cam 5 and, at this time, if a shift lever 1 is released from the parking position, the parking cam 5 is pulled backward (F3). As a result, the force (F2) for raising the sprag 4 generates a large frictional resistance between the parking cam 5 and the sprag 4, and thus the releasing force required to release the shift lever 1 from the parking position is increased. Moreover, when the vehicle is parked on a slope, a large rolling movement is generated in the powertrain by the torque applied to the drive wheels as shown in FIG. 2. Accordingly, as the parking lever 1 is released from the parking position, the friction between the sprag 4 and the parking gear 3 is removed and, at this time, the powertrain receiving a large force in the rolling direction is returned to its original position, thus generating large vibration, impact, and impact noise.

However, even when this conventional vehicle parking system is configured to satisfy the target value of the initial releasing force required to release the shift lever 1 from the parking position 1 in the design process, the releasing force is increased as the frequency of use of the shift lever 1 is increased. As a result, a shift cable 7 (connected to an operating lever 8) is stretched by the increase in the releasing force, which may displace the position of the shift lever 1. Moreover, the large impact and vibration generated when the shift lever 1 is released from the parking position reduce the quality of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide an apparatus for applying a torque for vibration reduction in a vehicle parking system and a method for controlling the torque, in which when a driver moves and release a shift lever from the P (parking) position to the R (reverse) position or the D (drive) position to start a vehicle parked on a slope, a torque is applied to a parking gear in a direction opposite to a rotating torque generated by the weight of the vehicle and the gradient of a slope, thereby offsets the torque being applied to the drive wheels by the weight of the vehicle and the gradient of the slope.

Other various aspects of the present invention are directed to provide a method for applying a torque for vibration reduction in a vehicle parking system, the method comprising detecting a driver's intention to release a parking state of a vehicle being parked on a slope and applying an offset torque to a parking gear to offset a torque generated by the weight of the vehicle and the gradient of the slope.

In various aspects of the present invention, detecting the driver's intention to release the parking state of the vehicle may comprise detecting whether the driver depresses a brake pedal, detecting whether the shift lever is in a parking position, and detecting whether a push button of the shift lever is pushed.

In other aspects, the method of the present invention may further comprise detecting whether the vehicle is to climb or descend such that the offset torque is calculated according to the weight of the vehicle and the gradient of the slope when it is detected that the vehicle is to climb or descend.

In still other aspects, the offset torque may be a torque obtained by amplifying a torque of an engine rotating at an idle rpm (revolutions per minute).

In yet other aspects, the offset torque may be a torque of a drive motor generated using the power of a battery.

In still yet other aspects, the offset torque may be the sum of a torque obtained by amplifying a torque of an engine rotating at an idle rpm and a torque of a drive motor generated using the power of a battery.

In further aspects, the method of the present invention may further comprise withdrawing the application of the offset torque when the shift lever is shifted out of the parking position.

Yet other various aspects of the present invention are directed to provide an apparatus for applying a torque for vibration reduction in a vehicle parking system, which is configured to apply an offset torque to a parking gear to offset a torque generated by the weight of a vehicle and the gradient of a slope when a driver's intention to release a parking state of the vehicle being parked on the slope is detected. The exemplary apparatuses may comprise a torque converter for receiving an output torque of an engine and amplifying the received torque, and a gear unit for receiving the output torque of the engine amplified by the torque converter and applying the received output torque to the parking gear.

Still other various aspects of the present invention are directed to provide an apparatus for applying a torque for vibration reduction in a vehicle parking system, which is configured to apply an offset torque to a parking gear to offset a torque generated by the weight of a vehicle and the gradient of a slope when a driver's intention to release a parking state of the vehicle being parked on the slope is detected. The exemplary apparatuses may comprise a drive motor directly connected to the parking gear, generating an offset torque using the power of a battery, and applying the offset torque.

Still yet other various aspects of the present invention are directed to provide an apparatus for applying an offset torgue which may be the sum of a torque obtained by amplifying a torque of an engine rotating at an idle rpm and a torque of a drive motor generated using the power of a battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
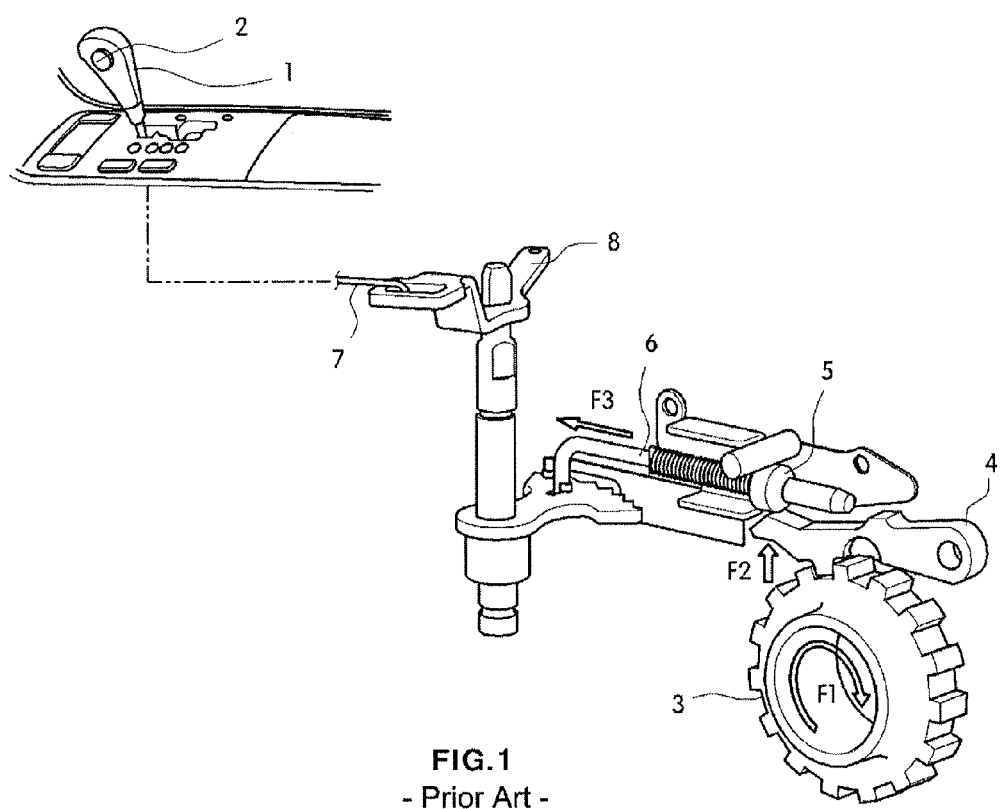
FIG. 1 is schematic diagram showing a conventional vehicle parking system.
Figure 2:
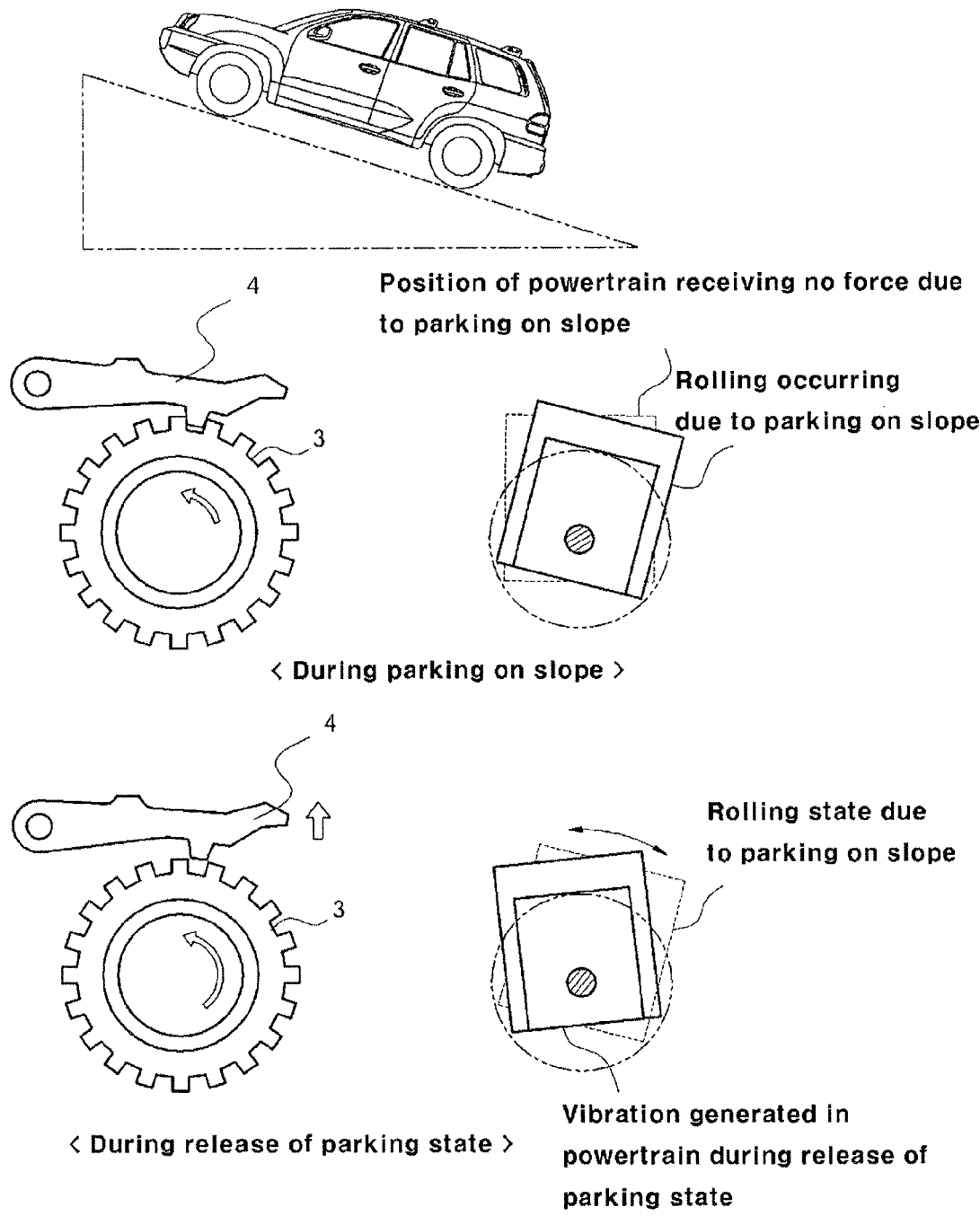
FIG. 2 is a schematic diagram showing the behavior of a conventional powertrain during parking on a slope and when a parking state is released.
Figure 3:
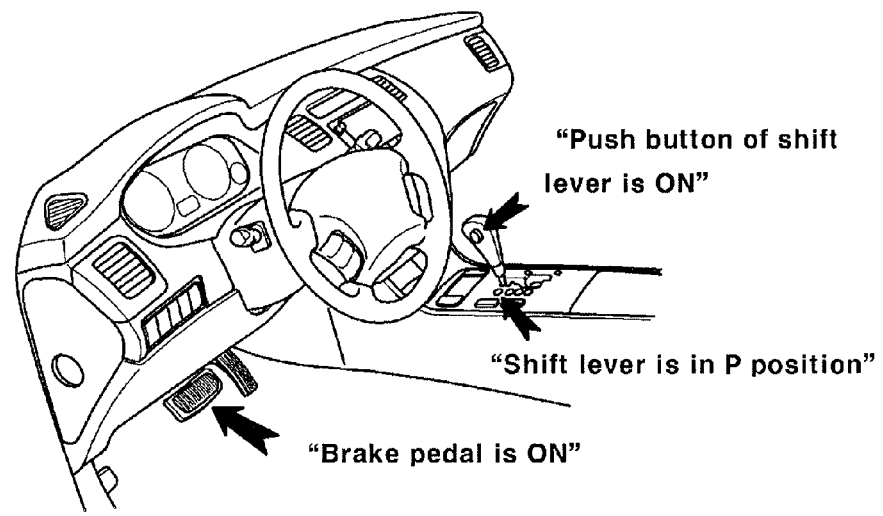
FIG. 3 is a schematic diagram showing the conditions for detecting a driver's intention to release a parking state in accordance with the present invention.
Figure 4:
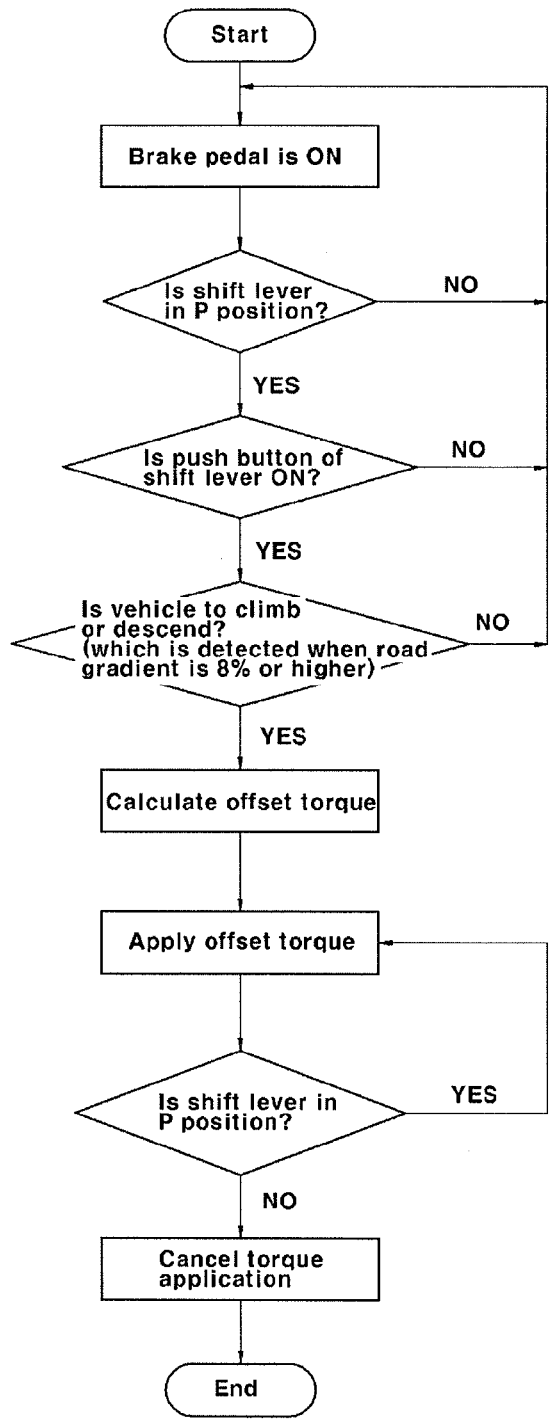
FIG. 4 is a flowchart showing an exemplary method for controlling a torque for vibration reduction in a vehicle parking system in accordance with the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

It is to be understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring to FIGS. 1-4, an exemplary method for applying a torque for vibration reduction in a vehicle parking system detects a driver's intention to release a parking state of a vehicle being parked on a slope and applies a torque to a parking gear in a direction opposite to a rotating torque generated by the weight of the vehicle and the gradient of a slope to offset the rotating torque applied to the parking gear, thereby reduces impact and vibration generated when the parking state of the vehicle parked on a slope is released by the driver and reduces the operating force required to release a shift lever from the parking state.

The driver's intention to release or move the shift lever 1 from the parking position when the vehicle is being parked on a slope may be detected by detecting whether the driver depresses a brake pedal, detecting whether the shift lever is in the parking position, and detecting whether a push button 2 of the shift lever 1 is pushed.

The state whether the driver depresses the brake pedal may be detected by a foot brake switch which transmits a brake operation signal to a controller at the same time when the driver depresses the brake pedal.

The parking position of the shift lever may be detected by an inhibitor switch of a decelerator. The inhibitor switch is connected to a shift cable 7 of the shift lever 1 to detect whether the shift lever 1 is in the parking, reverse or neutral position and transmit a corresponding signal to the controller.

The push button 2 of the shift lever 1 is pushed, for example, when the shift lever 1 is to be shifted from the parking position. The operation of the push button 2 may be detected in such a manner that a switch is connected to the push button 2 to transmit an operation signal (i.e., a push signal) of the push button 2 to the controller at the same time when the push button 2 of the shift lever 1 is pushed by the driver who intends to release the shift lever 1 from the parking position.

Figure 6:
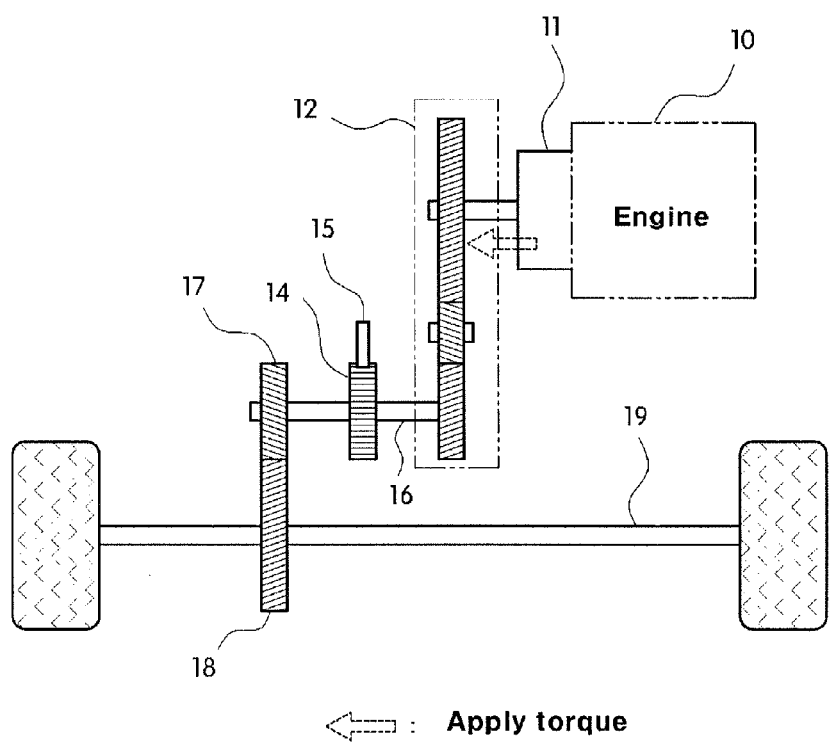
FIG. 6 is a schematic diagram showing an exemplary apparatus for applying a torque for vibration reduction in a vehicle parking system in accordance with the present invention.
Figure 7:
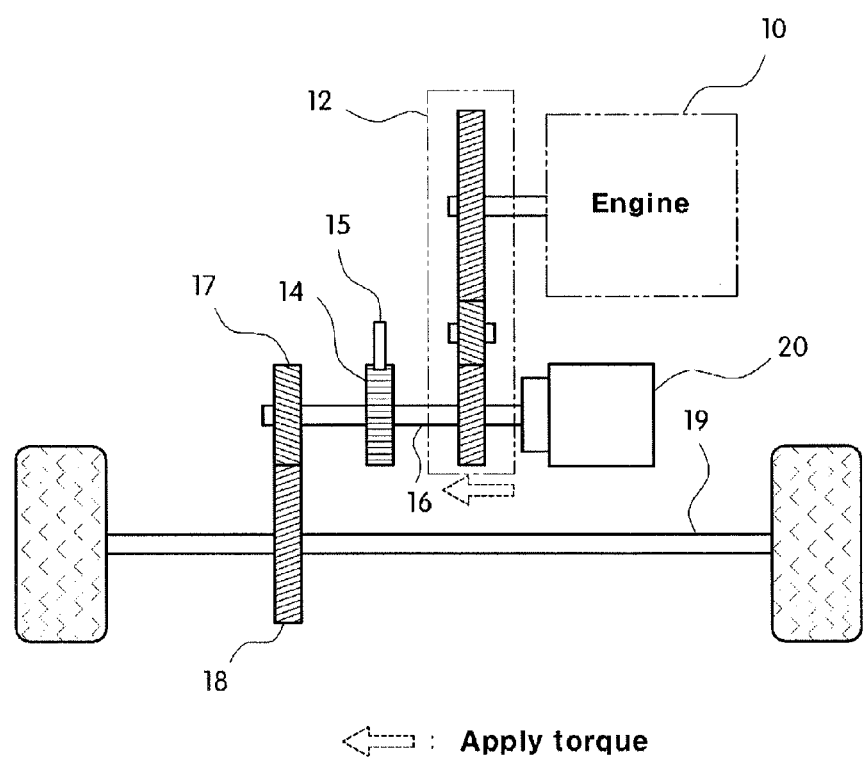
FIG. 7 is a schematic diagram showing another exemplary apparatus for applying a torque for vibration reduction in a vehicle parking system in accordance with the present invention.

Therefore, at the moment when the push button 2 of the shift lever 1 is pushed and turned on to release the shift lever 1 from the parking position, a torque (i.e., an offset torque) is applied to the parking gear 14 as shown in FIGS. 6 and 7 to offset the torque generated by the weight of the vehicle and the gradient of the slope, on the assumption that the foot brake is turned on and the shift lever 1 is in the parking position.

At this time, it is detected whether the vehicle is to climb or descend when the parking state is released or when the vehicle starts so as to apply a required amount of offset torque to the parking gear 14 depending on the state.

Here, the offset torque may vary according to the weight of the vehicle, the gradient of the slope, and whether the vehicle is to climb or descend when the vehicle starts, and other factors. The vehicle climbing or descending state and the gradient of the slope can be detected by an electronic stability program (ESP) employed in the vehicle. For example, the vehicle climbing or descending state may be detected when the gradient of the slope is 8% or higher.

Figure 5:
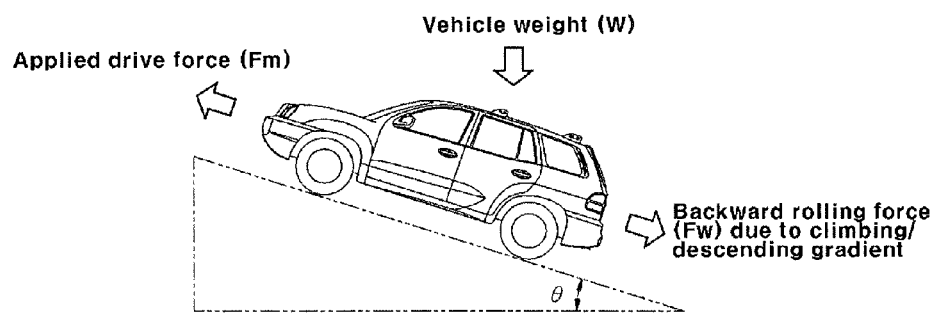
FIG. 5 is a schematic diagram showing an exemplary method for calculating an offset torque in accordance with the present invention.

The offset torque applied to the parking gear 14 can be calculated by the following Eq. (1) using the gross vehicle weight (GVW) and the gradient of the slope.

$$Fw = W \times \sin \theta$$

$$\text{offset torque} = Fw \times \eta \quad \text{Eq. (1)}$$

where Fw, W, $\theta$ and $\eta$ denote a backward rolling force due to the gradient of the slope, the gross vehicle weight, which is a fixed value for a specific type of a vehicle, the angle of the slope as shown in FIG. 5, and a coefficeint respectively.

The coefficient $\eta$ in Eq. (1) may take a value from 85% to 95%. The offset torque in an amount of 85 to 95%, preferably 90%, of the backward rolling force (Fw) due to the gradient of the slope is applied to the parking gear 14.

While the offset torque is applied to the parking gear 14, the current position of the shift lever 1 is continuously detected. If the shift lever 1 is in the parking position, the offset torque is continuously applied to the parking gear 14. Then, if the shift lever 1 is shifted out of the parking position, the application of the offset torque is withdrawn.

Referring to FIGS. 6 and 7, the methods of applying the offset torque to the parking gear 14 include a method of applying a torque of an engine rotating at an idle rpm (revolutions per minute) to the parking gear 14 and a method of directly applying a required amount of torque using a drive motor 20 depending on the state.

Referring to FIG. 6, the method of applying the torque of the engine 10 to the parking gear 14 is to amplify the torque output from the engine 10 in an idle state using a torque converter 11 and apply the amplified torque to the parking gear 14 through a gear unit 12 connected to the torque converter 11. The gear unit 12 is composed of a dedicated gear for applying the torque (i.e., offset torque) to the parking gear 14, which will be described later with respect to an apparatus for applying a torque for vibration reduction in a vehicle parking system.

Referring to FIG. 7, the method of directly applying the torque to the parking gear 14 using the drive motor 20 is to apply a required amount of torque (i.e., offset torque) to the parking gear 14 using a hydraulic motor or electric motor directly connected to the parking gear 14. In the case of the hydraulic motor, its operation is controlled using a hydraulic pump and a valve body of an automatic transmission, and in the case of the electric motor, its operation is controlled using the power of a battery provided in the vehicle. That is, the torque of the drive motor 20 generated using the power of the battery in the vehicle is applied to the parking gear 14.

As such, a torque (i.e., offset torque) is applied to the parking gear in a direction opposite to the rolling direction of the vehicle (i.e., opposite to the direction of the torque generated by the vehicle weight and the slope gradient), thereby offsetting the torque generated by the vehicle weight and the slope gradient. As a result, the frictional resistance between a parking cam and a sprag 15 is reduced, which in turn reduces the releasing force required to release the shift lever from the parking position, thereby reducing the vibration and impact noise generated when the parking state is released.

Accordingly, the momentary frictional force generated when the parking cam and the sprag are in contact with each other is reduced, which increases the durability of the components, thereby prevents the releasing force required by the shift lever (i.e., the operating force to release the shift lever from the parking position) from being increased.

Exemplary apparatuses for applying a torque for vibration reduction in a vehicle parking system controlled by the above-described method may be configured as shown in FIG. 6 or FIG. 7.

Referring to FIG. 6, an apparatus for applying a torque for vibration reduction in accordance with various embodiments of the present invention may comprise a torque converter 11 for receiving an output torque of an engine 10 and amplifying the received torque and a gear unit 12 for receiving the output torque of the engine 10 amplified by the torque converter 11 and applying the received output torque to a parking gear 14.

The gear unit 12 is connected to a drive shaft 16 as a rotating shaft of the parking gear 14 to apply the offset torque calculated by the above Formula 1 to the parking gear 14 such that the parking gear 14 offsets the rotating torque of the drive wheels connected to the parking gear 14 through an output gear 17, a differential ring gear 18, and a wheel shaft 19.

The gear unit 12 may comprise at least one gear member, and a suitable connection structure may be applied to the gear members constituting the gear unit 12 to increase the output torque of the torque converter 11.

Preferably, in various embodiments, the gear unit 12 is a dedicated gear for applying the offset torque to the parking gear 14, and a gear for applying a torque when the shift lever 1 is in a shift position such as the first position or the reverse position other than the parking position may be separately configured.

Referring to FIG. 7, an apparatus for applying a torque for vibration reduction in accordance with other embodiments of the present invention may comprise a drive motor 20 for receiving the power of a battery provided in the vehicle and generating a torque.

The drive motor 20 is connected to a parking gear 14 through a drive shaft 16 to directly apply the torque generated using the power of the battery to the parking gear 14.

Suitably, a gear unit 12 for directly receiving an output torque from an engine 10 and applying the received output torque to the parking gear is disposed between the parking gear 14 and the engine 10.

Accordingly, the drive motor 20 generates a torque by itself and applies the torque to the parking gear 14 or generates a torque and applies the torque to the parking gear 14 together with the engine 10, thereby amplifying the output torque applied to the parking gear 14.

That is, the offset torque may be the sum of the torque of the engine 10 rotating at an idle rpm and the torque of the drive motor 20 generated using the power of the battery.

The drive motor 20 may be configured with a hydraulic motor or electric motor. In the case of the hydraulic motor, its operation is controlled using a hydraulic pump and a valve body of an automatic transmission, and in the case of the electric motor, its operation is controlled using the battery power.

When the parking state of the vehicle is released using exemplary apparatuses for applying the torque for vibration reduction configured in the above manner according to the present invention, the offset torque calculated by Eq. (1) is applied to the parking gear to offset the torque applied to the drive wheels by the vehicle weight and the slope gradient, and thus it is possible to reduce the vibration and impact generated when the shift lever is released from the parking position.

Meanwhile, an exemplary apparatus for applying the torque for vibration reduction (in which the drive motor is used to apply the torque to the parking gear as shown in FIG. 7) was applied to a parking system of an electric vehicle, and the releasing force required by the shift lever and reduction of impact, vibration and noise were measured on a slope. The results are shown in the following Table 1.

For reference, since the parking gear is directly connected to the drive motor in the electric vehicle, the electric vehicle directly applies the torque of the drive motor to the parking gear.

TABLE 1

| | Experimental Results | | |
|---|---|---|---|
| | Comparative Example | Example | Design criteria |
| | Operating force for releasing the parking state | | |
| Climbing 33% | 5.3 Kgf | 2.4 Kgf | 7 Kgf ↓ |
| Descending 33% | 5.9 Kgf | 2.5 Kgf | |
| | Reduction of impact, vibration and noise | | |
| Impact, vibration & noise | Mild vibration/ Mild noise | No vibration No noise | N/A |

In Table 1, Comparative Example represents a system in which an exemplary apparatus for applying the torque for vibration reduction of the present invention is not employed, whereas Example represents a system in which the exemplary apparatus for applying the torque for vibration reduction of the present invention is employed. In addition, Kgf stands for kilogram-force.

From Table 1, it can be seen that in Example, the design criteria of the operating force for releasing the parking state is satisfied and further reduced to less than half of that in Comparative Example.

Moreover, as shown in Table 1, it can be seen that in Example, the vibration, impact, and noise generated in the powertrain are reduced when the parking state of the vehicle on a slope is released.

That is, it is experimentally confirmed that it is possible to reduce the operating force of the shift lever and the vibration and noise generated by the rolling of the powertrain when the shift lever of the vehicle being parked on a slope is released from the parking position.

As described above, according to the present invention, when the driver releases the shift lever from the parking position to start the vehicle being parked on a slope is detected, a torque is applied to the parking gear in a direction opposite to the torque generated by the vehicle weight and the slope gradient, thereby offsets the rotation torque acting on the parking torque. As a result, it is possible to reduce the frictional resistance between the sprag and the parking cam, thereby reduce the operating force for releasing the parking state of the shift lever. Moreover, it is possible to offset the force in the rolling direction applied to the powertrain, and thereby reduce the vibration and impact noise generated when the parking state is released.

Further, the reduced frictional force between the sprag and the packing cam can reduce the load applied to the components, and thus the durability of the components of the parking system can be increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for applying a torque for vibration reduction in a vehicle parking system, the method comprising:
   detecting a driver's intention to release a parking state of a vehicle being parked on a slope; and
   applying an offset torque to a parking gear to offset a torque generated by a weight of the vehicle and a gradient of the slope;
   wherein the offset torque is a torque obtained by amplifying a torque of an engine rotating at an idle rpm (revolutions per minute); and
   wherein the offset torque is applied to a wheel shaft through the parking gear connected to an output gear meshed with a differential ring gear that is connected to the wheel shaft in order to offset a rotating torque of drive wheels.

2. The method of claim 1, wherein detecting the driver's intention to release the parking state of the vehicle comprises:
   detecting whether the driver depresses a brake pedal;
   detecting whether a shift lever is in a parking position; and
   detecting whether a push button of the shift lever is pushed.

3. The method of claim 1, further comprising:
   detecting whether a vehicle is to climb or descend; and
   calculating the offset torque according to the weight of the vehicle and the gradient of the slope when it is detected that the vehicle is to climb or descend.

4. The method of claim 1, wherein the offset torque is a torque of a drive motor generated using a power of a battery.

5. The method of claim 1, wherein the offset torque is the sum of a torque obtained by amplifying a torque of an engine rotating at an idle rpm (revolutions per minute) and a torque of a drive motor generated using a power of a battery.

6. The method of claim 1, further comprising withdrawing the application of the offset torque when a shift lever is shifted out of a parking position.

7. An apparatus for applying the method of claim 1, comprising:
   a torque converter for receiving an output torque of an engine and amplifying the received torque; and
   a gear unit for receiving the output torque of the engine amplified by the torque converter and applying the received output torque to the parking gear;
   wherein the gear unit is engaged to a drive shaft of the parking gear to apply the offset torque to the parking gear connected to the output gear meshed with the differential ring gear that is connected to the wheel shaft, wherein the gear unit is a dedicated gear for applying the offset torque to the parking gear.

8. An apparatus for applying the method of claim 1, comprising a drive motor directly connected to the parking gear, generating the offset torque using a power of a battery, and applying the offset torque to the parking gear.

9. An apparatus for applying the method of claim 1, comprising:
   a torque converter for receiving an output torque of an engine and amplifying the received torque;

a gear unit for receiving the output torque of the engine amplified by the torque converter and applying the received output torque to the parking gear; and a drive motor directly connected to the parking gear, generating a torque using a power of a battery, and applying the torque to the parking gear, wherein the offset torque received by the parking gear equals to a sum of the output torque of the engine amplified by the torque converter and the torque generated by the drive motor using the power of the battery.

* * * * *